United States Patent [19]

Provonche

[11] Patent Number: 5,952,938

[45] Date of Patent: Sep. 14, 1999

[54] REMOTE PCM CUT-OFF SECURITY SYSTEM

[76] Inventor: David E. Provonche, 8307 St. Marys, Detroit, Mich. 48228

[21] Appl. No.: 08/948,416

[22] Filed: Oct. 10, 1997

[51] Int. Cl.$^6$ ................................................. G06G 7/00
[52] U.S. Cl. ..................... 340/825.72; 180/167; 701/50; 701/53
[58] Field of Search ................. 340/825.69, 825.72; 307/9.1, 10.1–10.3, 10.5; 701/53, 50; 180/167

[56] References Cited

U.S. PATENT DOCUMENTS

| 3,800,902 | 4/1974 | Keller ........................... 180/79.1 |
| 5,508,689 | 4/1996 | Rado et al. ..................... 340/825.06 |
| 5,696,679 | 12/1997 | Marshall et al. ................ 464/424.082 |
| 5,815,087 | 9/1998 | Campbell et al. ................ 340/825.54 |

*Primary Examiner*—William A. Cuchlinski, Jr.
*Assistant Examiner*—Yonel Beaulieu

[57] ABSTRACT

A power train control module cut off device is provided including a power train control module mounted within a vehicle for allowing the operation of the vehicle only upon the interconnection therewith. The power train control module has an I/O port connected thereto with a plurality of contacts. Next provided is a wire harness having a first end connected to the vehicle and a second end with an I/O port connected thereto with a plurality of contacts. An interconnection assembly is included with a housing having a pair of end faces. One of the end faces has a first I/O port mounted thereon with a plurality of contacts for connecting to the I/O port of the power train control module. Another one of the end faces has a second I/O port mounted thereon with a plurality of contacts for connecting to the I/O port of the wire harness. The housing has an interior space in which there is a switching mechanism. In use, the switching mechanism has a first orientation for affording interconnection between the power train control module and the vehicle and a second orientation for precluding such interconnection.

4 Claims, 2 Drawing Sheets

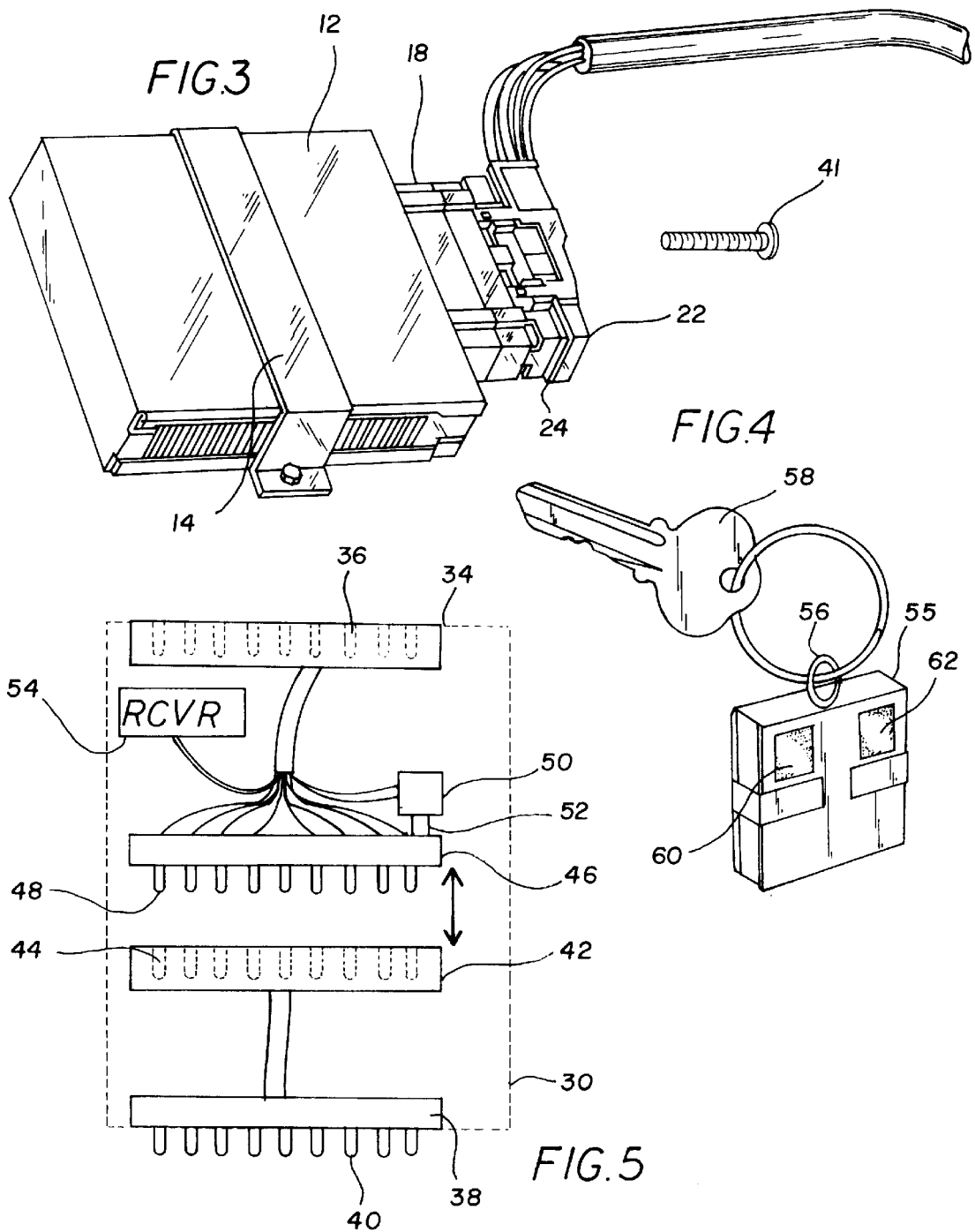

REMOTE PCM CUT-OFF SECURITY SYSTEM

BACKGROUND OF THE INVENTION

1. Field of the Invention

The present invention relates to vehicular anti-theft devices and more particularly pertains to a new REMOTE PCM CUT-OFF SECURITY SYSTEM for preventing the theft of a vehicle by disconnecting a powertrain control module from the vehicle.

2. Description of the Prior Art

The use of vehicular anti-theft devices is known in the prior art. More specifically, vehicular anti-theft devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicular anti-theft devices include U.S. Pat. No. 5,382,948; U.S. Pat. No. 5,453,730; U.S. Pat. No. 4,884,055; U.S. Pat. No. 4,660,528; and U.S. Pat. No. 4,619,231.

In these respects, the REMOTE PCM CUT-OFF SECURITY SYSTEM according to the present invention substantially departs from the conventional concepts and designs of the prior art, and in so doing provides an apparatus primarily developed for the purpose of preventing the theft of a vehicle by disconnecting a powertrain control module from the vehicle.

SUMMARY OF THE INVENTION

In view of the foregoing disadvantages inherent in the known types of vehicular anti-theft devices now present in the prior art, the present invention provides a new REMOTE PCM CUT-OFF SECURITY SYSTEM construction wherein the same can be utilized for preventing the theft of a vehicle by disconnecting a powertrain control module from the vehicle.

The general purpose of the present invention, which will be described subsequently in greater detail, is to provide a new REMOTE PCM CUT-OFF SECURITY SYSTEM apparatus and method which has many of the advantages of the vehicular anti-theft devices mentioned heretofore and many novel features that result in a new REMOTE PCM CUT-OFF SECURITY SYSTEM which is not anticipated, rendered obvious, suggested, or even implied by any of the prior art vehicular anti-theft devices, either alone or in any combination thereof.

To attain this, the present invention generally comprises a power train control module mounted within a vehicle by way of a bracket. Such power train module is included for allowing the operation of the vehicle only upon the interconnection therewith, as is conventional in the art of vehicles. The power train control module has an I/O port connected thereto with a plurality of protrusions contacts. Associated therewith is a wire harness having a first end connected to the vehicle. A second end of the wire harness is equipped with an I/O port connected thereto with a plurality of aperture contacts. Next provided is an interconnection assembly including a housing with a pair of end faces. One of the end faces has a first I/O port mounted thereon with a plurality of aperture contacts for connecting to the I/O port of the power train control module. Another one of the end faces has a second I/O port mounted thereon with a plurality of protrusion contacts for connecting to the I/O port of the wire harness. As shown in FIG. 5, the housing has an interior space in which there is a first contact fixedly coupled. The first contact has a plurality of aperture contacts connected to the protrusion contacts of the second I/O port via a plurality of wires. Further positioned within the interior space of the housing is a second contact slidably coupled therein with a plurality of protrusion contacts connected to the aperture contacts of the first I/O port. By this structure, the second contact has an engaged orientation wherein the contacts of the first and second contacts are in electrical communication. In such orientation, interconnection between the power train control module and the vehicle is afforded. The second contact further has a disengaged orientation with the contacts of the first and second contacts distanced. Also shown in FIG. 5 is a solenoid situated within the housing. The solenoid has a transducer connected to the second contact of the intermediate assembly. As such the solenoid is adapted for moving the second contact to the engaged orientation upon the receipt of an activation signal and further moving the second contact to the disengaged orientation upon the receipt of a deactivation signal. Also situated within the housing is a receiver which is connected to the solenoid. During use, the receiver functions to transmit the activation and deactivation signals thereto upon the receipt thereof via free space. Finally, a remote controller is provided having a housing with an eyelet for coupling with a set of keys. Note FIG. 4. The remote controller is adapted to transmit via free space the activation signal upon the depression of an activation button situated on a top face thereof. Further, the remote controller functions to transmit via free space the deactivation signal upon the depression of a deactivation button. As shown in FIG. 4, the deactivation button is situated on the top face thereof beside the activation button.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new REMOTE PCM CUT-OFF SECURITY SYSTEM apparatus and method which has many of the advantages of the vehicular anti-theft devices mentioned heretofore and many novel features that result in a new REMOTE PCM CUT-OFF SECURITY SYSTEM which is not anticipated, rendered obvious, suggested, or even implied by any of the prior art vehicular anti-theft devices, either alone or in any combination thereof.

It is another object of the present invention to provide a new REMOTE PCM CUT-OFF SECURITY SYSTEM which may be easily and efficiently manufactured and marketed.

It is a further object of the present invention to provide a new REMOTE PCM CUT-OFF SECURITY SYSTEM which is of a durable and reliable construction.

An even further object of the present invention is to provide a new REMOTE PCM CUT-OFF SECURITY SYSTEM which is susceptible of a low cost of manufacture with regard to both materials and labor, and which accordingly is then susceptible of low prices of sale to the consuming public, thereby making such REMOTE PCM CUT-OFF SECURITY SYSTEM economically available to the buying public.

Still yet another object of the present invention is to provide a new REMOTE PCM CUT-OFF SECURITY SYSTEM which provides in the apparatuses and methods of the prior art some of the advantages thereof, while simultaneously overcoming some of the disadvantages normally associated therewith.

Still another object of the present invention is to provide a new REMOTE PCM CUT-OFF SECURITY SYSTEM for preventing the theft of a vehicle by disconnecting a power-train control module from the vehicle.

Even still another object of the present invention is to provide a new REMOTE PCM CUT-OFF SECURITY SYSTEM that includes a power train control module mounted within a vehicle for allowing the operation of the vehicle only upon the interconnection therewith. The power train control module has an I/O port connected thereto with a plurality of contacts. Next provided is a wire harness having a first end connected to the vehicle and a second end with an I/O port connected thereto with a plurality of contacts. An interconnection assembly is included with a housing having a pair of end faces. One of the end faces has a first I/O port mounted thereon with a plurality of contacts for connecting to the I/O port of the power train control module. Another one of the end faces has a second I/O port mounted thereon with a plurality of contacts for connecting to the I/O port of the wire harness. The housing has an interior space in which there is a switching mechanism. In use, the switching mechanism has a first orientation for affording interconnection between the power train control module and the vehicle and a second orientation for precluding such interconnection.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the present invention in use.

FIG. 4 is a perspective view of the remote controller of the present invention.

FIG. 5 is a cross-sectional view of the present invention.

DESCRIPTION OF THE PREFERRED EMBODIMENT

Figure 1:
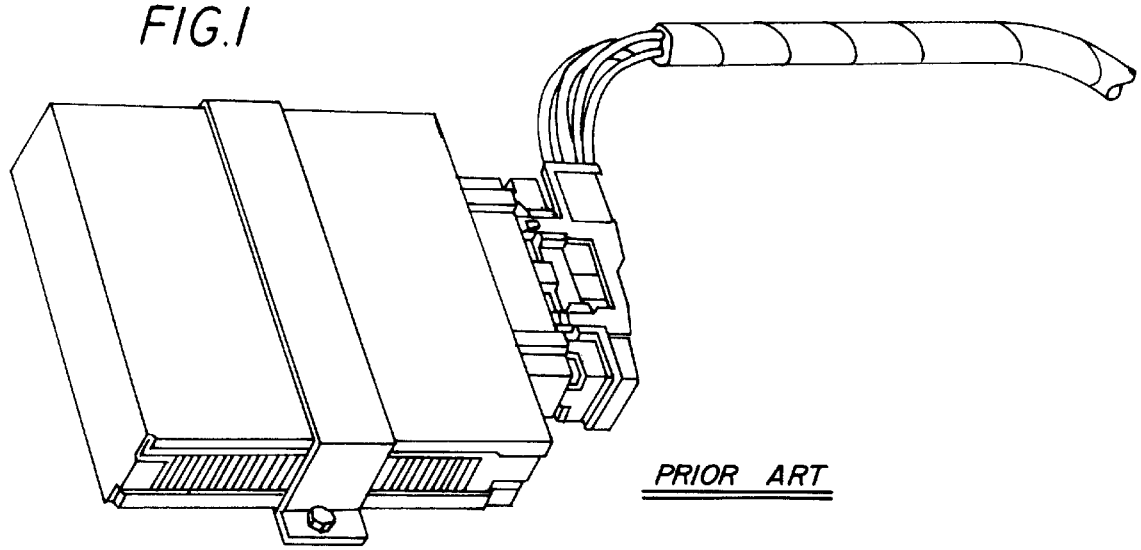
FIG. 1 is a perspective view of a prior art PCM with an associated wire harness connected thereto.
Figure 2:
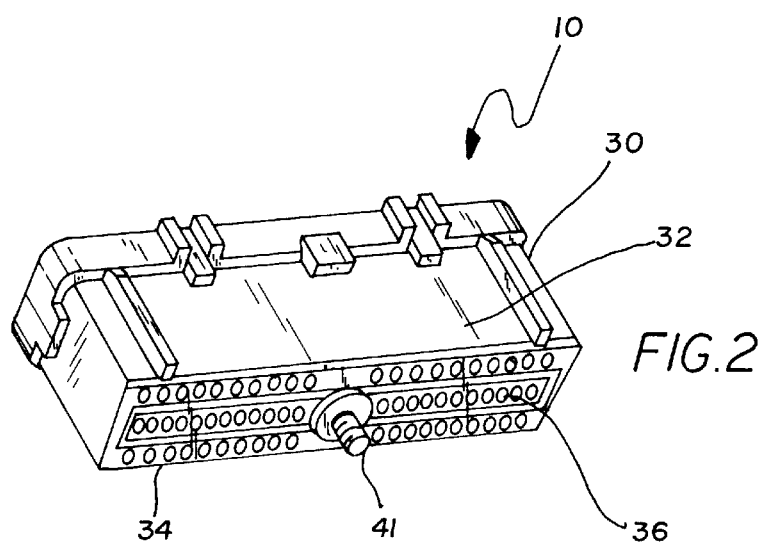
FIG. 2 is a perspective view of the present invention.

With reference now to the drawings, and in particular to FIGS. 1 through 5 thereof, a new REMOTE PCM CUT-OFF SECURITY SYSTEM embodying the principles and concepts of the present invention and generally designated by the reference numeral 10 will be described.

The system designated as numeral 10 includes a power train control module (PCM) 12 mounted within a vehicle by way of a bracket 14. Such power train control module is included for allowing the operation of the vehicle only upon the interconnection therewith, as is conventional in the art of vehicles. The power train control module has an I/O port 18 connected thereto with a plurality of protrusions contacts.

Associated therewith is a wire harness 22 having a first end connected to the vehicle. A second end of the wire harness is equipped with an I/O port 24 connected thereto with a plurality of aperture contacts.

Next provided is an interconnection assembly 30 including a housing 32 with a pair of end faces. One of the end faces has a first I/O port 34 mounted thereon with a plurality of aperture contacts 36 for connecting to the I/O port of the power train control module. Another one of the end faces has a second I/O port 38 mounted thereon with a plurality of protrusion contacts 40 for connecting to the I/O port of the wire harness. For maintaining the ports of the PCM, intermediate assembly, and wire harness in a fixed orientation, an elongated bolt 41 is threadedly coupled within a plurality of aligned threaded apertures formed in each of the components of the present invention.

As shown in FIG. 5, the housing has an interior space in which there is a first contact 42 fixedly coupled. The first contact has a plurality of aperture contacts 44 connected to the protrusion contacts of the second I/O port via a plurality of wires. Further positioned within the interior space of the housing is a second contact 46 slidably coupled therein with a plurality of protrusion contacts 48 connected to the aperture contacts of the first I/O port.

By this structure, the second contact has an engaged orientation wherein the protrusion and apertures contacts of the first and second contacts are in electrical communication. In such orientation, interconnection between the power train control module and the vehicle is afforded. The second contact further has a disengaged orientation with the contacts of the first and second contacts distanced. Note FIG. 5.

Also shown in FIG. 5 is a solenoid 50 situated within the housing. The solenoid has a transducer 52 connected to the second contact of the intermediate assembly. As such the solenoid is adapted for moving the second contact to the engaged orientation upon the receipt of an activation signal and further moving the second contact to the disengaged orientation upon the receipt of a deactivation signal.

Also situated within the housing is a receiver 54 which is connected to the solenoid. During use, the receiver functions to transmit the activation and deactivation signals thereto upon the receipt thereof via free space.

Finally, a remote controller 55 is provided having a portable housing with an eyelet 56 for coupling with a set of keys 58. Note FIG. 4. The remote controller is adapted to transmit via free space the activation signal upon the depression of an activation button 60 situated on a top face thereof. Further, the remote controller functions to transmit via free space the deactivation signal upon the depression of a deactivation button 62. As shown in FIG. 4, the deactivation button is situated on the top face thereof beside the activation button.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A power train control module cut off device comprising, in combination:

a power train control module mounted within a vehicle by way of a bracket for allowing the operation of the vehicle only upon the interconnection therewith, the power train control module having an I/O port connected thereto with a plurality of protrusion contacts;

a wire harness having a first end connected to the vehicle and a second end with an I/O port connected thereto with a plurality of aperture contacts;

an interconnection assembly including a housing with a pair of end faces, one of the end faces having a first I/O port mounted thereon with a plurality of aperture contacts for connecting to the I/O port of the power train control module and another one of the end faces having a second I/O port mounted thereon with a plurality of protrusion contacts for connecting to the I/O port of the wire harness, the housing having an interior space in which there is a first contact fixedly coupled and having a plurality of aperture contacts connected to the protrusion contacts of the second I/O port and a second contact slidably coupled with a plurality of protrusion contacts connected to the aperture contacts of the first I/O port, wherein the second contact has an engaged orientation wherein the contacts of the first and second contacts are in electrical communication thereby affording interconnection between the power train control module and the vehicle and a disengaged orientation with the contacts of the first and second contacts distanced;

a solenoid situated within the housing having a transducer connected to the second contact of the intermediate assembly for moving the second contact to the engaged orientation upon the receipt of an activation signal and further moving the second contact to the disengaged orientation upon the receipt of a deactivation signal;

a receiver situated within the housing and connected to the solenoid for transmitting the activation and deactivation signals thereto upon the receipt thereof via free space;

a remote controller having a housing with an eyelet for coupling with a set of keys, the remote controller serving to transmit via free space the activation signal upon the depression of an activation button situated on a top face thereof and further to transmit via free space the deactivation signal upon the depression of a deactivation button situated on the top face thereof beside the activation button; and a bolt for threadedly engaging threaded bores formed in the power train control module, the interconnection assembly, and the wire harness for maintaining the same fixed with respect to each together.

2. A power train control module cut off device comprising:

a power train control module mounted within a vehicle for allowing the operation of the vehicle only upon the interconnection therewith, the power train control module having an I/O port connected thereto with a plurality of contacts;

a wire harness having a first end connected to the vehicle and a second end with an I/O port connected thereto with a plurality of contacts;

an interconnection assembly including a housing with a pair of end faces, one of the end faces having a first I/O port mounted thereon with a plurality of contacts for connecting to the I/O port of the power train control module and another one of the end faces having a second I/O port mounted thereon with a plurality of contacts for connecting to the I/O port of the wire harness, the housing having an interior space in which there is a switching means, wherein the switching means has a first orientation for affording interconnection between the power train control module and the vehicle and a second orientation for precluding such interconnection;

wherein the switching means includes a first contact fixedly coupled within the housing and having a plurality of contacts connected to the contacts of the second I/O port and a second contact slidably coupled within the housing with a plurality of protrusion contacts connected to the contacts of the first I/O port, wherein the second contact has an engaged orientation wherein the contacts of the first and second contacts are in electrical communication thereby affording interconnection between the power train control module and the vehicle and a disengaged orientation with the contacts of the first and second contacts distanced;

wherein the switching means includes a solenoid situated within the housing having a transducer connected to the second contact of the intermediate assembly for moving the second contact to the engaged orientation upon the receipt of an activation signal and further moving the second contact to the disengaged orientation upon the receipt of a deactivation signal.

3. A power train control module cut off device as set forth in claim 2 wherein the switching means is transferred between the first and second orientation from afar.

4. A power train control module cut off device as set forth in claim 2 wherein the switching means further includes a receiver situated within the housing and connected to the solenoid for transmitting the activation and deactivation signals thereto upon the receipt thereof via free space and further included is a remote controller serving to transmit via free space the activation signal upon the depression of an activation button and further to transmit via free space the deactivation signal upon the depression of a deactivation button.

* * * * *